Oct. 30, 1923.

J. H. HAND 1,472,122

CHANGE SPEED GEARING

Filed Oct. 16, 1920 4 Sheets-Sheet 1

INVENTOR.
Jesse H. Hand
BY
Ralzemond A. Parker
ATTORNEY.

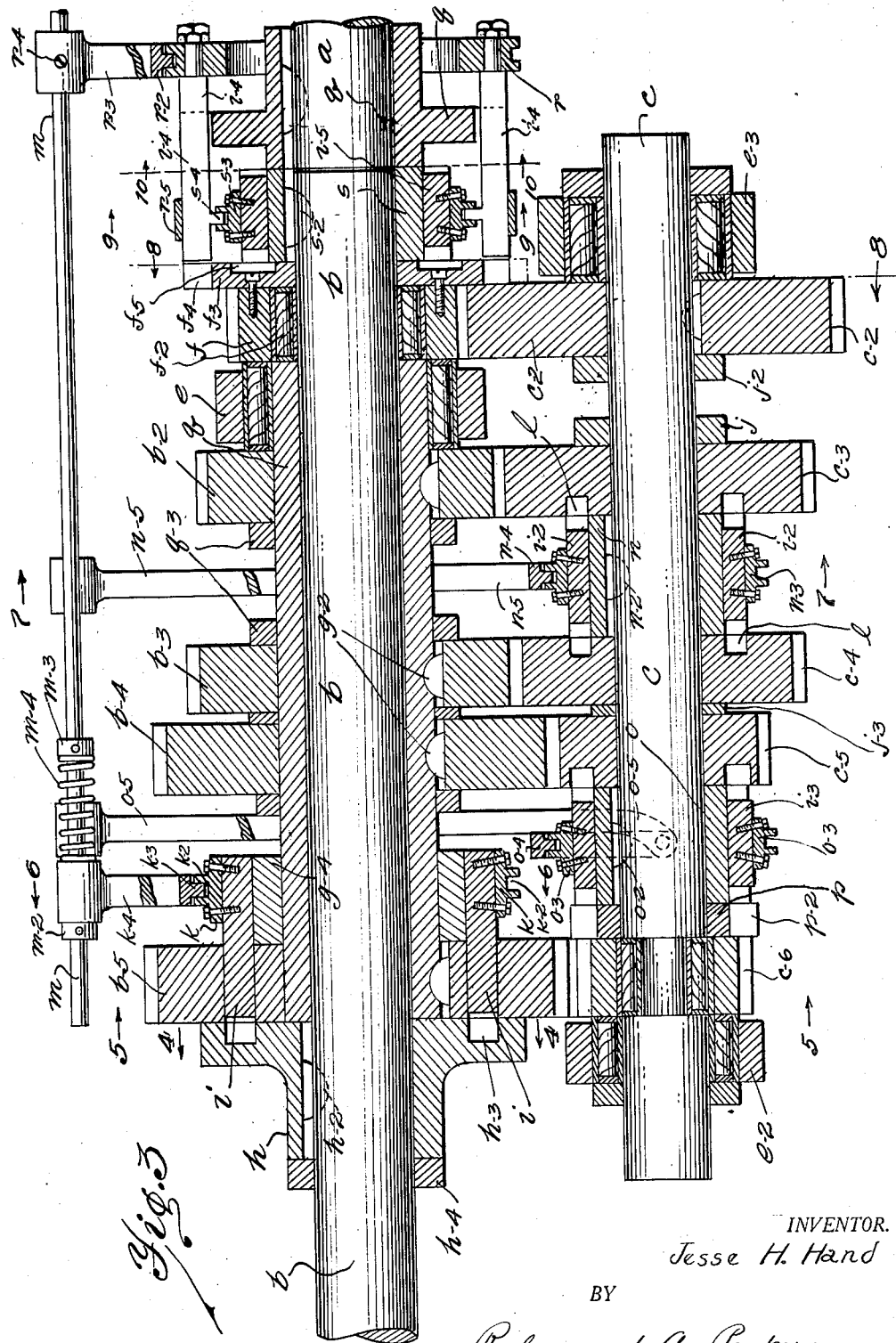

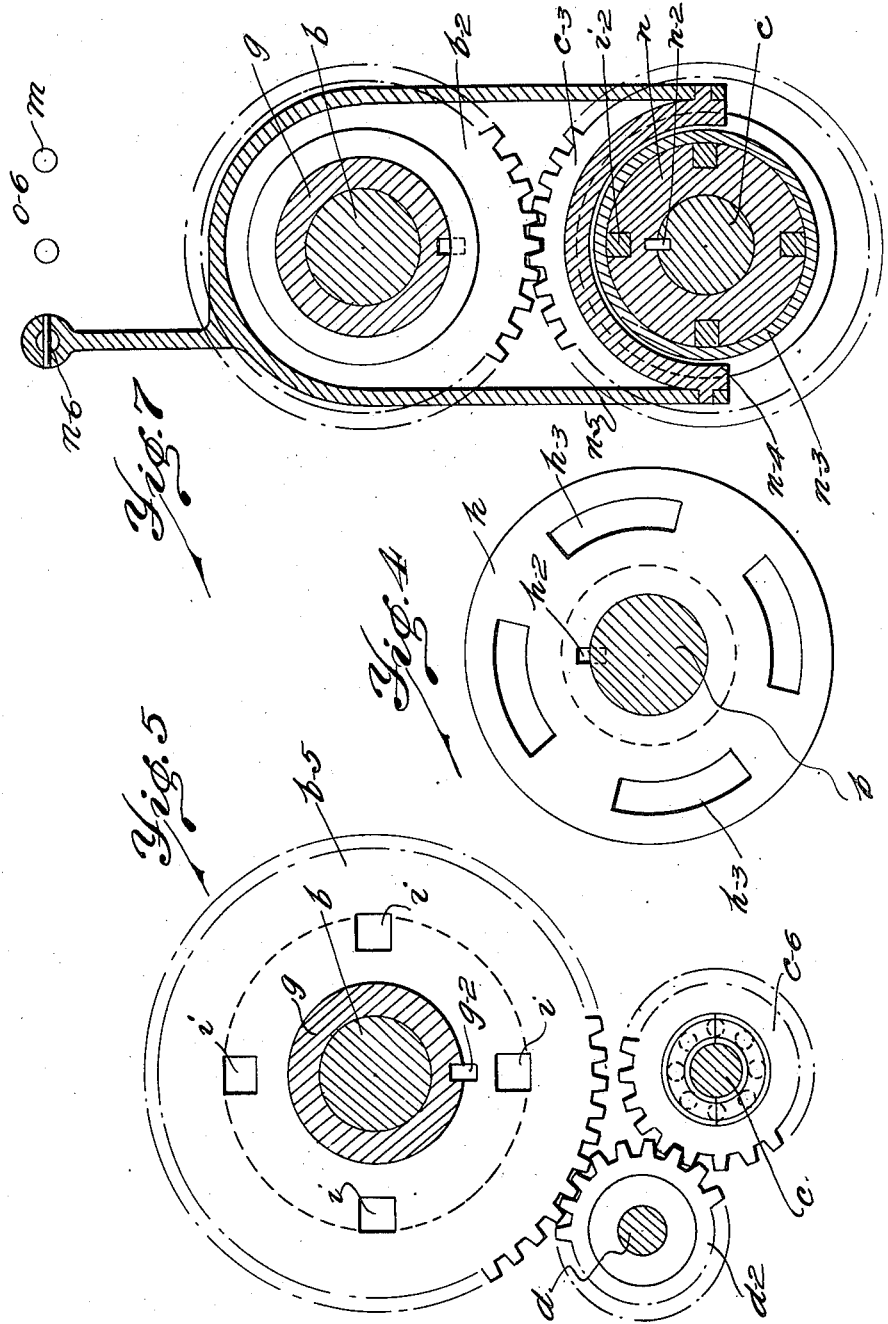

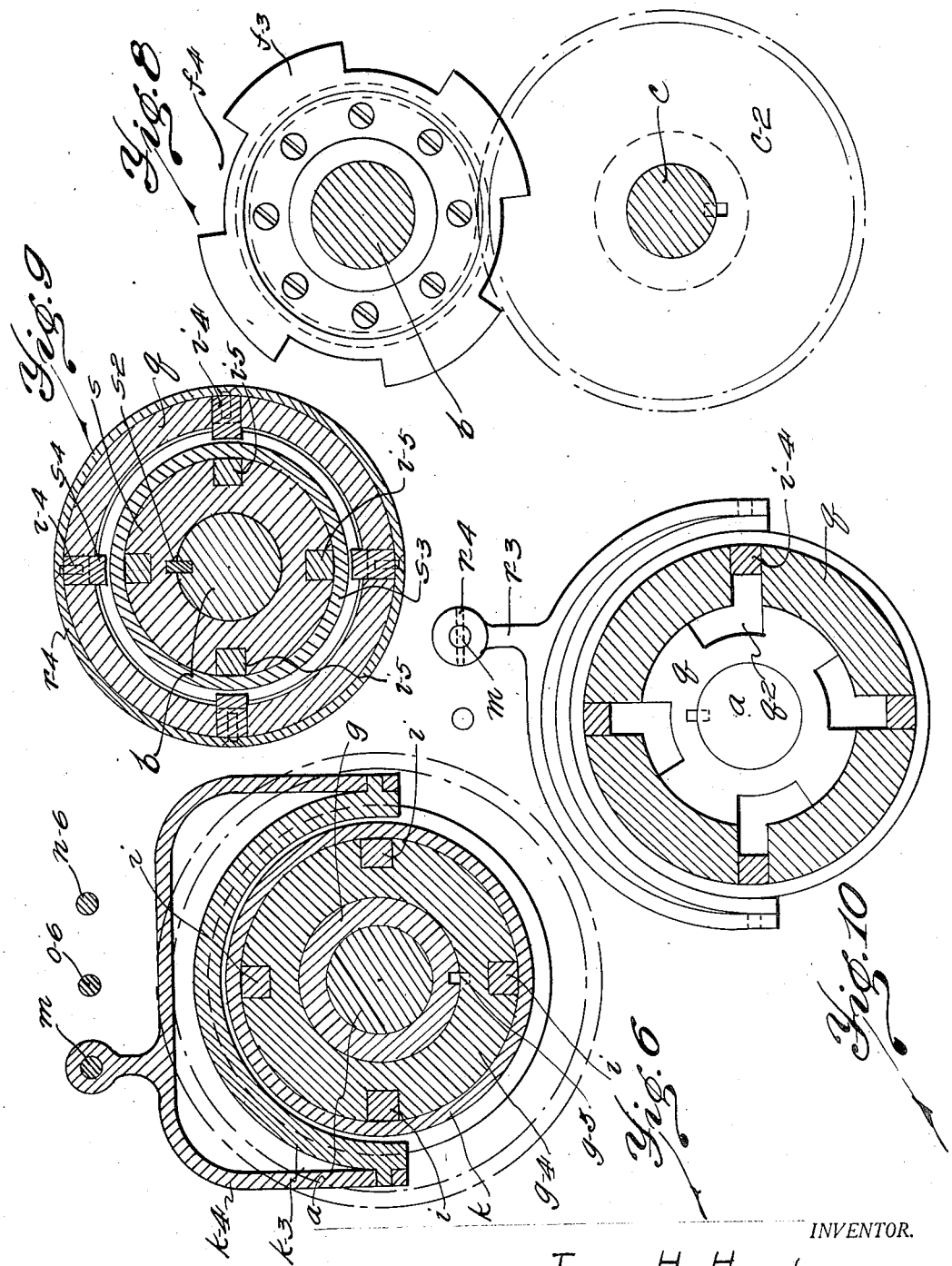

Patented Oct. 30, 1923.

1,472,122

UNITED STATES PATENT OFFICE.

JESSE H. HAND, OF DETROIT, MICHIGAN.

CHANGE-SPEED GEARING.

Application filed October 16, 1920. Serial No. 417,329.

*To all whom it may concern:*

Be it known that I, JESSE H. HAND, a citizen of the United States, residing at Detroit, county of Wayne, State of Michigan, have invented a certain new and useful Improvement in Change-Speed Gearing, and declare the following to be a full, clear, and exact description of the same, such as will enable others skilled in the art to which it pertains to make and use the same, reference being had to the accompanying drawings, which form a part of this specification.

My invention relates to a constant mesh change-speed gearing for automotive vehicles. An object is to provide a change-speed gearing of the constant mesh type in which the driving shaft can be coupled directly with the main shaft so as to drive the same, while the variable speed gears remain stationary.

Another object is to provide a constant mesh change-speed gearing of simple construction and few parts and easy of operation and possessing long wearing qualities.

Another object is to provide a constant mesh change-speed gearing in which it is possible to drive the main shaft at varying speeds by coupling a driving gear on the main shaft with the driving shaft and selecting the proper gear on the countershaft to drive thru, and also to drop all the gears and connect the main shaft with the driving shaft so as to drive direct, as hereinafter set forth in the specification and claims.

In the drawings,—

Fig. 3 is a vertical section thru Fig. 1.

Fig. 4 is a cross-section taken on the line 4—4, Fig. 3.

Fig. 5 is a cross-section taken on the line 5—5, Fig. 3.

Fig. 6 is a cross-section taken on the line 6—6, Fig. 3.

Fig. 7 is a cross-section taken on the line 7—7, Fig. 3.

Fig. 8 is a cross-section taken on the line 8—8, Fig. 3.

Fig. 9 is a cross-section taken on the line 9—9, Fig. 3.

Fig. 10 is a cross-section taken on the line 10—10, Fig. 3.

Figure 1:
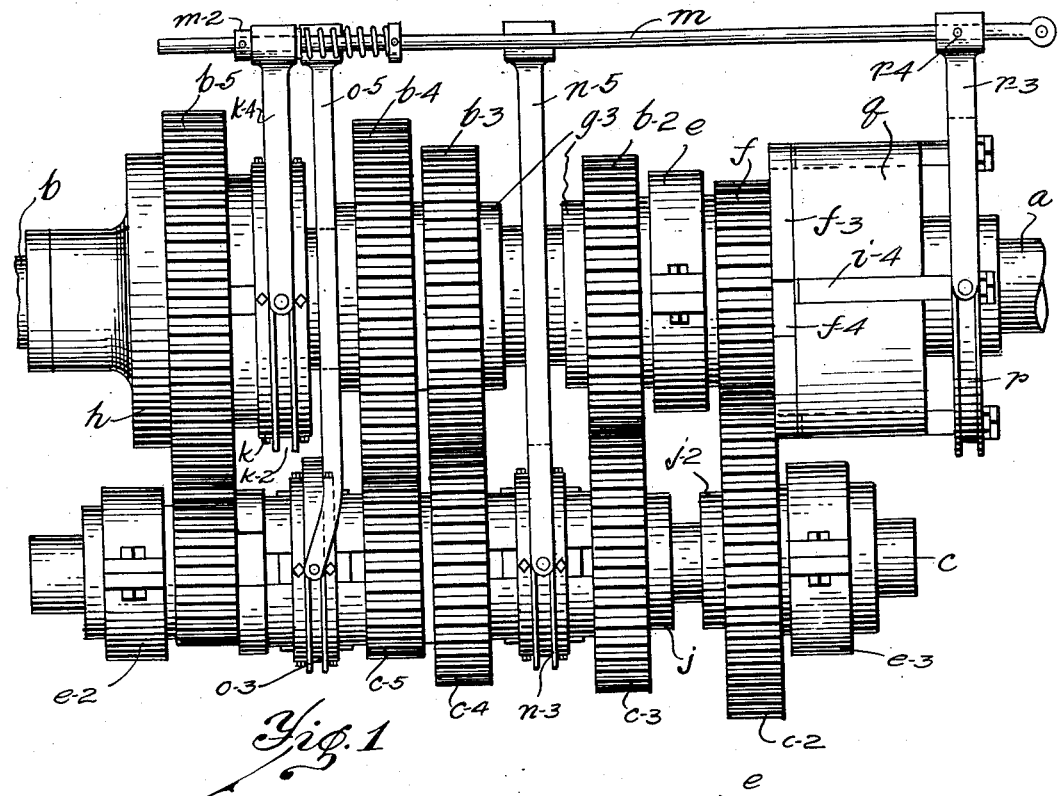
Figure 1 is an elevation of my new change-speed gearing.
Figure 2:
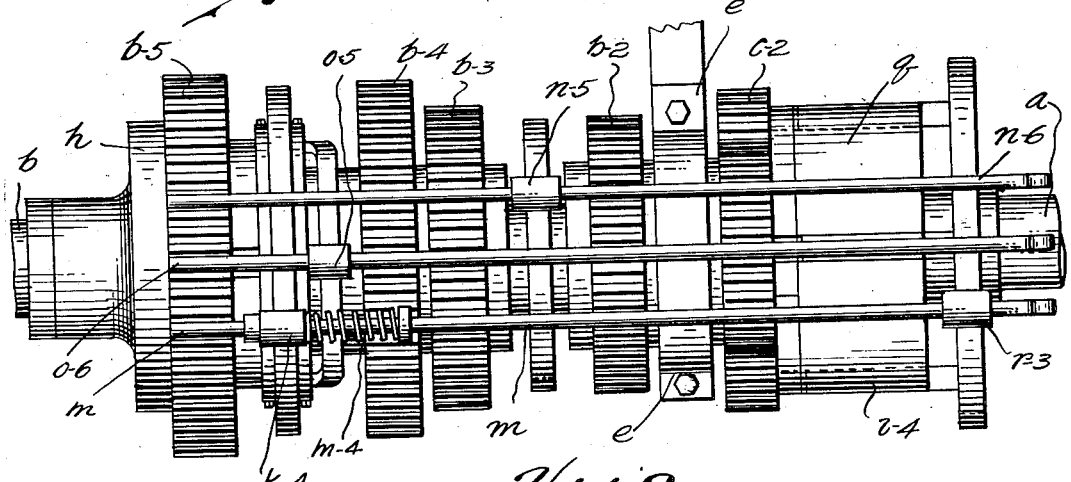
Fig. 2 is a plan view of Fig. 1.

Let $a$ indicate the driving shaft, $b$ the driven or main shaft; $c$ the counter-shaft and $d$ the shaft on which the reverse gear is mounted. One end of the main shaft is suitably supported in a bearing block $e$ and bearing blocks $e^2$, $e^3$ are provided at opposite ends of the countershaft to support such shaft.

There is mounted near the forward end of the main shaft a driving gear $f$ carried on such shaft by means of suitable bearings $f^2$ so that such gear will rotate independently of the shaft. This gear $f$ is in constant mesh with gear $c^2$ which is secured to the countershaft $c$ so that the countershaft will be driven thereby. Also mounted on the main shaft are a plurality of gears $b^2$, $b^3$, $b^4$ and $b^5$ of varying ratios secured to a sleeve $g$ by means of keys $g^2$ which run in a provided key-way in the sleeve. The gears are held in their spaced relationship by means of collars $g^3$ secured to the sleeve $g$. This sleeve is mounted on the main shaft so as to permit independent rotation of the main shaft but means are provided for locking the sleeve to such shaft so that it will rotate therewith. Such locking means comprises a hub $h$ secured to the main shaft by a key $h^2$ and held in position on such shaft abutting the end of the sleeve a collar $h^4$. The face of the hub which lies adjacent the gear $b^5$ carried by the sleeve is provided with a series of locking recesses $h^3$ arranged concentric with the circumference and adapted to receive the locking keys $i$ so as to lock the gear $b^5$ and thru such gear the sleeve $g$ to the hub $h$. It will be seen that this locking of the gear $b^5$ and hub $h$ will lock the main shaft and the sleeve together so that they will rotate as one piece.

Secured to the sleeve on the opposite side of the gear $b^5$ is a collar $g^4$ longitudinally slotted to provide key-ways within which the keys $i$, four of which are here shown, are disposed as shown in Figs. 3 and 6. These keys are of such length as to project beyond the collar $g^4$ and into the gear $b^5$ which gear $b^5$ is therefore slotted forming an extension of the slot thru the collar to enable the keys to pass thru the gear. Means are provided to move the keys $i$ thru the gear $b^5$ and into locking recesses $h^3$ in the hub, locking the gear $b^5$ and the hub together. This means consists of a clamping ring $k$ encircling the collar $g^4$ and fastened to each of the keys, as shown in Fig. 3, means being provided to move such clamping ring longitudinally over the collar. The ring $k$ is circumferentially grooved as at $k^2$ to receive the tongue projection of a yoke member $k^3$. This yoke is carried by a shifting ring $k^4$ secured thereto as shown in Fig. 6. This shifting ring is mounted on a shift rod $m$ so as to be moved longitudinally of the main shaft to shift the keys into and out of engagement with the hub.

It will be seen that the shifting ring is so mounted on the shift rod as to permit of its limited movement on such rod, as hereinafter described. The ring is mounted between two fixed stops on the rod, such stops indicated as $m^2$, $m^3$ and held yieldingly against one of the stops by means of a spring $m^4$ so that when the keys $i$ are thrown rearwardly to engage the hub, if they do not strike the provided recesses in the hub they will be held yieldingly thereagainst by means of the spring $m^4$ so that when the hub is rotated to bring the recess $h^3$ opposite the keys they will be forced therein, locking the mechanism as described.

In addition to the gear $c^2$ secured to the countershaft and thru which the countershaft is driven, this shaft carries a plurality of gears of varying ratios indicated as $c^3$, $c^4$, and $c^5$, which are in constant mesh with the gears $b^2$, $b^3$, and $b^4$ respectively on the main shaft. These gears on the countershaft are so mounted thereon that the countershaft may be rotated independently of such gears, but means are provided for locking each of said gears individually to the countershaft so that the shaft will rotate therewith.

$j$ and $j^2$ indicate collars to hold gears $c^2$ and $c^3$ in position on the shaft.

Mounted on the countershaft between the gears $c^3$ and $c^4$ is a collar $n$ keyed to the shaft by means of key $n^2$, which collar or hub is longitudinally slotted providing key-ways in which are disposed movable keys $i^2$, four of such keys being here shown. The faces of the gears $c^3$ and $c^4$ adjacent the collar and opposite the keys are recessed as at $l$ forming interlocking recesses within which the keys may be projected to lock the gear to the collar so that the gear will rotate with the shaft. These keys are shifted by mechanism similar to that described for moving the keys $i$, a clamping ring $n^3$ being provided and secured to such keys and slidable over the hub $n$. This ring is grooved to receive a yoke member $n^4$ which is carried by a shifting ring $n^5$ secured to the shift rod $n^6$ thru which the keys $i^2$ are shifted into or out of engagement with the gears $c^3$ and $c^4$, so as to lock such gears to the countershaft. A spacing member or washer $j^3$ is provided between the gears $c^4$ and $c^5$ so as to facilitate free independent movement of such gears.

As part of the reversing mechanism the gear $c^6$, shown as being suitably supported on provided bearings is mounted near the rear end of the countershaft. This gear is in constant mesh with the reinforcing gear $d^2$ which in turn is in constant mesh with the gear $b^5$ on the main shaft.

Either the gear $c^5$ or $c^6$ may be individually locked to the countershaft by an arrangement similar to that described for the locking of gear $c^3$ or $c^4$ to said shaft. A collar or hub $o$ is provided separating such gears, such hub being secured to the shaft by a key $o^2$. This hub $o$ carries keys $i^3$ in slotted key-ways held therein for movement longitudinally of the hub as a unit by a clamping ring $o^3$, such ring carrying a yoke member $o^4$ and being in turn carried by a shifting ring $o^5$ which is secured to the shift rod $o^6$. To secure greater leverage on the gear $o^6$ which is of small diameter, a plate $p$ of greater diameter is secured to the side of the gear, such plate being recessed as at $p^2$ to receive the keys $i^3$.

To engage the driving shaft with the variable speed mechanism, or to engage such driving shaft directly with the driven or main shaft, I provide on the driving shaft at the meeting end with the main shaft $a$ the hub $q$ secured to such shaft so as to rotate therewith. This hub is hollowed out to receive the end of the main shaft, as shown in Figs. 3 and 9. To lock the hub with the driving gear $f$ on the main shaft, keys $i^4$ are provided movable in provided keyways in the wall of the hub, such keys being carried by a clamping ring $r$ in the grooved circumference of which a tongue yoke member $r^2$ is carried, such yoke being supported by a shifting ring $r^3$ which is secured to the shift rod $m$ by a pin $r^4$. It will be noted that the shift rod $m$ also carries the shifting ring $k^4$, which ring carries keys $i$, therefore the keys $i$ and $i^4$ will be shifted concurrently in the same direction. A further clamping ring $r^5$ is provided to hold such keys in position in the key-ways in the hub. These keys when shifted toward the gear $f$ are adapted to engage in recesses $f^4$ in a plate $f^3$ which is secured to such gear $f$. This plate $f^3$ is provided merely to increase the diameter of the gear where the keys engage therewith.

A secondary set of keys $i^5$ is provided carried in provided key-ways in a collar $s$ which is keyed to the main shaft $a$ by means of a key $s^2$. This collar is fixed to the end of the main shaft positioned within the hub as shown in Fig. 3. These keys are held in place by a clamping ring $s^3$, which ring is circumferentially grooved to receive a tongue or projecting lug $s^4$ formed on the keys $i^4$ so that when the keys $i^4$ are moved the keys $i^5$ will also be moved in the same direction. The interior of the hub is recessed as at $q^2$ to receive the ends of the keys $i^5$ to lock the collar $s$ and thru such collar the main shaft to the hub $q$. These locking recesses in the hub are arc-shaped as are the others, hereinafter described, to enable a gear to be picked up more quickly by the keys. It will be seen that when the keys $i^5$ are shifted to lock the main shaft to the hub that the keys $i^4$ are moved out of their locking engagement with the gear $f$, and that when the keys $i^4$ are moved to the position shown in Fig. 13, the keys $i^5$ are in the neutral position, being disconnected from their driving relationship with the hub $q$.

In the operation of this device the mechanism is shown in neutral position in Fig. 3. When it is desired to drive thru any of the variable speed gears on the counter-shaft or to reverse the movement, the shift rod $m$ is actuated and thru the shifting rings $r^3$ and $k^4$ the keys $i^4$ and $i$ respectively are likewise actuated. Keys $i^4$ engage in the provided interlocking recesses $f^4$ in plate $f^6$ thereby picking up gear $f$ to rotate with the hub and the drive shaft $a$ and thru such gear driving the countershaft $c$. The plate $f^3$ is provided with a groove $f^5$ concentric with its circumference, within which the end of the keys $i^5$ may ride when the keys $i^4$ are thrown into engagement with such plate. If the keys $i$ carried by the shifting ring $k^4$ are not positioned so as to fall immediately into the recesses $h^3$ in the hub $h$ by virtue of the yielding connection thru shifting ring $k^4$ with the shift rod $m$ these keys will be held yieldingly against the face of the hub $h$ until it is rotated to bring the recess $h^3$ opposite the end of the keys and they will be projected therein by action of the spring $n^4$.

This above-described improvement will therefore not only lock the driving shaft to the driving gear $f$, but also lock the sleeve $g$ and the gears carried thereon to the main shaft $b$.

Shifting of the keys $i^2$ or $i^3$ carried by hubs on the countershaft will now serve to lock any of the variable speed gears in the forward drive to such countershaft, or to lock reversing gear $c^6$ to such shaft. Whichever gear on the countershaft is picked up by means of these keys will set in motion the main shaft thru its enmeshed gear mounted on the sleeve of said main shaft, which sleeve is now locked to the shaft. It is possible therefore thru actuation of the sets of keys $i^2$ or $i^3$ to pick up any of the forward speeds except high speed and to pick up the reverse gear. When it is desired to run at the highest speed the engaged keys on the countershaft are moved to the neutral position and shift-rod $m$ is actuated to bring the keys $i^5$ into interlocking engagement with the hub $q$ and the keys $i^4$ are released from their engagement with the plate $f^3$, dropping the gear $f$ and thru such gear dropping all the change-speed gears and driving directly from the hub $q$ thru the keys $i^5$ to the hub $s$ and the main shaft $b$.

It will be seen that this actuation of the shift-rod $m$ to bring the keys $i^5$ into engagement with the hub $q$ will also serve to release the hub $h$ from its driving relation with the sleeve $g$. It is apparent, therefore, that all the gears are constantly in mesh and that at the high or direct driving speed all the gears will be idle.

What I claim is:

1. In a change-speed gearing, in combination, a driving shaft, a main shaft, a countershaft, a sleeve mounted on said main shaft to permit rotation of the main shaft independent of the sleeve, means for locking said sleeve to said main shaft to rotate therewith, change-speed gears fixed to the sleeve to rotate therewith, change-speed gears mounted on the countershaft constantly in mesh with the change-speed gears on the main shaft, means for coupling said driving shaft thru the change-speed gears on the counter shaft with individual gears on the sleeve to drive the main shaft therethru, means for coupling the driving shaft directly with the main shaft to drive the same independently of the change-speed gears.

2. In a change speed gearing, a driving shaft, a main shaft, a counter shaft, change speed gears mounted on said main shaft, change speed gears on said counter shaft constantly in engagement with the change speed gears on the main shaft, a hub carried by said driving shaft to rotate therewith hollowed out to receive the end of the main shaft, locking members disposed within said hub operable to couple the main shaft with the driving shaft to be driven directly thereby at the same rate of speed, and means operable to couple the hub with the change speed gears on the counter shaft to drive the main shaft through the counter shaft at varying rates of speed.

3. In a change speed gearing, a driving shaft, a main shaft, change speed gears mounted on said main shaft to permit rotation of the main shaft independably thereof but adapted to be locked as a unit to the shaft to rotate therewith, a counter shaft, change speed gears on said counter shaft, means for locking independent gears on the counter shaft thereto to rotate therewith, a hollow hub carried by said driving shaft and adapted to receive the end of the main shaft, locking members disposed within the interior of the hub operable to lock the hub to the main shaft to rotate therewith and auxiliary locking members exterior the hub operable to couple the hub to the main shaft through the counter shaft to drive the main shaft at varying rates of speed, and means operable concurrently with said last mentioned locking members, locking members to couple the gears on the main shaft as a unit thereto to rotate therewith.

4. In a change-speed gearing, a driving shaft, a main shaft, a driving gear loosely mounted on said main-shaft, means for coupling said driving shaft with said driving gear to drive the same, means for driving said main-shaft at varying rates of speed thru trains of gears driven by said driving gear, means for coupling said driving shaft directly with said main-shaft so they will rotate as one piece independently of the gears.

5. In a change-speed gearing, a driving shaft, a main shaft, a driving gear mounted on said main-shaft so as to rotate independently thereof, means for coupling said driving gear with said driving shaft so the same will rotate therewith, a sleeve freely mounted on said main-shaft so as to permit the main-shaft to be rotated independently thereof, gears of varying ratios carried by said sleeve so as to rotate therewith, means for locking said sleeve to said main-shaft in order that the main-shaft shall rotate with the sleeve, a counter-shaft driven by said driving gear carried on the main-shaft, gears of varying ratios mounted on said counter-shaft so as to permit the counter shaft to be rotated independently thereof, such gears in constant mesh with gears on the sleeve, means for locking individual gears on the counter-shaft thereto to rotate therewith, means for coupling said main-shaft with said driving-shaft so the same will rotate therewith independently of the gears.

6. In a change-speed gearing, a driving shaft, a main-shaft, a driving-gear mounted on said main-shaft so as to be rotated independently thereof, means for coupling said driving gear with the driving-shaft so the same will rotate therewith, a sleeve freely mounted on said main-shaft, a plurality of gears carried by said sleeve and secured thereto, means for coupling said sleeve with said main-shaft substantially at the same time the driving-shaft is coupled with the said driving gear so that said sleeve will rotate with the main-shaft, a counter-shaft carrying a gear in constant mesh with said driving gear on the main-shaft so the counter-shaft will be driven thereby, gears of varying ratios loosely mounted on said counter-shaft in constant mesh with the gears carried by said sleeve, means for locking individual gears on the counter-shaft thereto to rotate therewith, means for coupling said driving-shaft with said main-shaft so they will rotate as one piece at the same time uncoupling the driving shaft from the driving gear mounted on the main-shaft so that the driving-shaft and main-shaft rotating together will rotate independently of all of the gears, the gears remaining stationary.

7. In a change-speed gearing, a driving-shaft, a main shaft, a series of gears mounted on said main-shaft in such a manner as to permit said main-shaft to be rotated independently thereof, but adapted to lock as a unit thereto to rotate therewith, a counter-shaft and a series of gears carried thereon which are in constant mesh with certain gears on the main-shaft, a reversing gear in constant mesh with a gear on the counter-shaft and a gear on the main-shaft, means for locking said gears on the main-shaft as a unit thereto so they will rotate as one piece therewith, means for coupling said driving-shaft with the counter-shaft so the counter-shaft will rotate therefrom and at substantially the same time locking the unit of gears on the main-shaft to said main-shaft, means for individually locking certain of the gears on the counter-shaft thereto so as to rotate therewith, means for coupling said main shaft with the driving shaft and at the same time uncoupling the counter-shaft from its driving relationship with the driving-shaft and uncoupling the unit of gears on the main-shaft from such main-shaft so that the main-shaft will rotate as one piece with the driving-shaft independently of the gears.

8. In a change-speed gearing, a driving shaft, a main-shaft, a series of gears mounted on said main-shaft in such a manner as to permit the main-shaft to be rotated independently thereof, means for locking the said gears as a unit to such main-shaft so they will rotate therewith, a driving gear mounted on said main-shaft so as to be rotated independently thereof, a counter-shaft carrying a gear which is in constant mesh with said driving-gear so the counter-shaft will be driven therefrom, a series of gears mounted on the counter-shaft in such a manner that the counter-shaft may be rotated independently thereof but adapted to be locked individually thereto so as to rotate with such counter-shaft, such gears in constant mesh with certain gears on the main-shaft, means for coupling said driving-shaft with the driving gear on the main-shaft so as to drive the main-shaft thru the counter-shaft and at varying rates of speed, and coincident with the coupling of the driving-shaft with the driving-gear on the main-shaft actuating the locking means to the position to lock the unit of gears on the main-shaft thereto to rotate therewith, such coupling means adapted to be moved so as to uncouple the driving shaft from the said driving-gear and the unit of gears on the main-shaft from the said main-shaft, and coupling said driving-shaft with said main-shaft so they will rotate as one piece independently of all the gears.

9. In a change-speed gearing, a driving-shaft, a main-shaft, a plurality of gears mounted on said main-shaft so as to permit such main-shaft to be rotated independently thereof but adapted to be locked as a unit thereto so as to rotate therewith, a driving gear mounted on said shaft so as to be rotated independently thereof, a hub carried at the end of said driving-shaft so as to rotate therewith, such hub recessed to receive the end of said main-shaft, means for locking said hub with said driving-gear mounted on said main-shaft so the gear will rotate with the hub, a counter-shaft adapted to be driven by said driving gear, a plurality of gears mounted on said counter-shaft so as to permit the counter-shaft to be rotated independently thereof but such gears adapted to be locked individually to such shaft so as to rotate therewith, certain of such gears on the counter-shaft in constant mesh with the gears on the main-shaft, means for locking said gears on the counter-shaft individually to such shaft so as to rotate therewith, means for locking the hub on the driving shaft with the main-shaft so they will rotate as one piece, and at the same time releasing the hub from its driving engagement with said driving gear.

10. In a change-speed gearing, a driving-shaft, a main-shaft, a plurality of gears on said main-shaft so mounted that the main-shaft is rotatable independently thereof, means for locking such gears as a unit to such main-shaft to rotate therewith, a driving gear carried by such main-shaft and independently rotatable thereon, such driving gear provided with an interlocking surface, a hub carried by such driving-shaft recessed to receive the end of the main-shaft, such hub provided with key-ways extending longitudinally of the shaft, keys fitted in said key-ways, means for actuating such keys so as to engage with the interlocking surface of the driving gear so that such gear and hub will rotate as one piece, a collar carried by the main-shaft disposed interior the hub provided with key-ways, keys fitted in such key-ways in the collar adapted to be actuated at the same time and in the same direction as the keys carried by the hub, said hub recessed to receive said keys carried by the collar so as to lock the hub and collar together to rotate as one piece, a counter-shaft provided with a plurality of independently rotatable gears, said counter-shaft carrying a gear in constant mesh with the driving gear on the main-shaft so the counter-shaft will be driven thereby, means for locking any one of the independently rotatable gears on said counter-shaft to such shaft so as to drive therethru to the main-shaft.

11. In a change-speed gearing, a driving shaft, a main-shaft, a hub carried at the end of said driving shaft recessed to receive the end of said main-shaft, a plurality of gears mounted on said main-shaft, a counter shaft, a plurality of gears mounted on said counter-shaft in constant mesh with the gears on the main-shaft, a driving gear independently rotatably mounted on said main-shaft adjacent the end of said hub and coupled with said counter-shaft so as to drive the same, means for coupling said driving-gear with said hub so the same will be driven thereby, means disposed within said hub movable longitudinally of said main-shaft adapted to couple said main-shaft with said hub so the same will be driven thereby, the variable speed mechanism adapted to be uncoupled from its driving relationship with the main-shaft coincident with the coupling of the main-shaft with the driving-shaft so as to be directly driven thereby.

12. In a change-speed gearing, a driving shaft, a hollow hub carried thereby, a main shaft one end of which is received within said hub, a driving gear loosely mounted on said main shaft, change speed gears adapted to couple said driving gear with said main shaft to drive the same at varying rates of speed, means for coupling said driving gear with said hub to rotate therewith, means for coupling said main shaft with said hub to be rotated independently of said driving gear.

13. In a variable speed gearing, a driving shaft, a main shaft, a countershaft, variable-speed, constant-mesh gears carried by said main and countershafts, a hub carried by said driving shaft to rotate therewith, said hub provided with an inner and an outer set of keyways, slidable keys carried in said outer set of keyways in the hub adapted to be actuated to couple said main shaft with said hub thru the change-speed gears on the countershaft to drive said main shaft, slidable keys adapted to be received in said inner set of keyways in the hub adapted to be actuated to lock said hub with said main shaft so that the main shaft and driving shaft will rotate as one piece independently of the change-speed gears.

14. In a variable speed gearing, in combination, a driving shaft, a main shaft, a counter shaft, variable speed gears mounted on said main and counter shafts, a coupling hub carried by said driving shaft to rotate therewith, said hub provided with two sets of keyways, a set of slidable keys movable in one set of key ways adapted to be actuated to couple said hub with said main shaft thru the variable speed gears, a second set of slidable keys movable in the other set of keyways adapted to be actuated to couple the hub directly with the main shaft so the main shaft will rotate as one piece with the driving shaft.

15. In a variable speed gearing, a drive shaft, a main shaft, a sleeve carrying variable speed gears and mounted on said main shaft so as to permit rotation of the main shaft independent of the sleeve, means for locking said sleeve with said main shaft to rotate therewith, a hollow hub carried by said driving shaft, coupling mechanism adapted to be actuated to lock said main shaft and driving shaft together through said hub to rotate as one piece independently of the sleeve, said mechanism further adapted to be actuated to lock said driving shaft through the hub and through the change-speed gears on the sleeve with the main shaft to drive the same at varying rates of speed.

In testimony whereof, I sign this specification.

JESSE H. HAND.